United States Patent
Mueller et al.

(10) Patent No.: US 8,024,104 B2
(45) Date of Patent: Sep. 20, 2011

(54) METHOD FOR CONTROLLING A FUEL INJECTION SYSTEM OF AN INTERNAL COMBUSTION ENGINE

(75) Inventors: Norbert Mueller, Farmington Hills, MI (US); Peter Roth, Ludwigsburg (DE); Heiko Straub, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 6 days.

(21) Appl. No.: 12/208,899

(22) Filed: Sep. 11, 2008

(65) Prior Publication Data
US 2009/0105928 A1    Apr. 23, 2009

(30) Foreign Application Priority Data
Sep. 14, 2007  (DE) .................. 10 2007 044 001

(51) Int. Cl.
*F02D 41/22* (2006.01)
*F02D 41/38* (2006.01)

(52) U.S. Cl. ...... 701/104; 701/103; 123/446; 123/198 D

(58) Field of Classification Search .................. 123/446, 123/447, 458, 460, 198 D; 701/103, 104
See application file for complete search history.

(56) References Cited

U.S. PATENT DOCUMENTS

| | | | | |
|---|---|---|---|---|
| 5,727,515 | A * | 3/1998 | Biester | 123/198 D |
| 6,234,148 | B1 * | 5/2001 | Hartke et al. | 123/447 |
| 7,156,076 | B2 * | 1/2007 | Holl et al. | 123/446 |
| 7,284,539 | B1 * | 10/2007 | Fukasawa et al. | 123/506 |
| 7,347,188 | B2 * | 3/2008 | Ohshima | 123/458 |
| 7,438,052 | B2 * | 10/2008 | Awano et al. | 123/456 |
| 7,444,993 | B2 * | 11/2008 | Hofmeister | 123/479 |
| 7,827,963 | B2 * | 11/2010 | Li et al. | 123/457 |
| 2004/0079336 | A1 * | 4/2004 | Jay et al. | 123/446 |
| 2005/0005912 | A1 * | 1/2005 | Joos et al. | 123/458 |
| 2005/0229896 | A1 * | 10/2005 | Hori | 123/198 D |
| 2006/0169252 | A1 * | 8/2006 | Ludwig et al. | 123/447 |
| 2008/0041331 | A1 * | 2/2008 | Puckett | 123/198 D |
| 2009/0007885 | A1 * | 1/2009 | Serra et al. | 123/456 |

FOREIGN PATENT DOCUMENTS

DE    198 53 103    5/2000

* cited by examiner

*Primary Examiner* — Stephen K Cronin
*Assistant Examiner* — Arnold Castro
(74) *Attorney, Agent, or Firm* — Merchant & Gould P.C.

(57) ABSTRACT

In a method for controlling a fuel injection system of an internal combustion engine with at least one combustion chamber, wherein the fuel injection system comprises a high pressure pump, whose flow rate is controllable, a control parameter of the high pressure pump is evaluated during the operation of the internal combustion engine. Said control parameter makes a detection of a bottleneck with the high pressure pump with respect to fuel quantity possible.

15 Claims, 2 Drawing Sheets

METHOD FOR CONTROLLING A FUEL INJECTION SYSTEM OF AN INTERNAL COMBUSTION ENGINE

The invention at hand relates to a method for controlling a fuel injection system of an internal combustion engine with at least one combustion chamber, the fuel injection system comprising a high pressure pump, whose flow rate is controllable.

Such a fuel injection system is known from the German patent DE 198 53 103 A1. It comprises a high pressure pump, whose flow rate can be adjusted, in that the quantity of fuel entering a conveying chamber of the high pressure pump is metered. For this purpose, provision is made for a fuel metering unit upstream from the conveying chamber. Said fuel metering unit has a more or less decontrolled opening cross-section, through which the fuel must pass on the way to the conveying chamber. In so doing, it is assumed that the flow rate of the high pressure pump is proportional to the opening cross-section.

PROBLEMS OF THE TECHNICAL FIELD

High pressure pumps of internal combustion engines are typically configured in such a way, that the delivery of a fuel quantity required for the operation of the internal combustion engine is still guaranteed even when all of the so-called critical operating conditions simultaneously occur. Such critical operating conditions are conditions, which can bring about a reduction in the flow rate during the operation of the respective internal combustion engine. In so doing, the high pressure pumps are, however, configured for the most part significantly larger than is required to guarantee the delivery of the required fuel quantity when the majority of these critical operating conditions occur.

SUMMARY

For that reason, a task of the invention at hand is to provide a method and a device, which allow for an improved control of a fuel injection system of an internal combustion engine with at least one combustion chamber and a high pressure pump.

This problem is solved by a method for controlling a fuel injection system of an internal combustion engine with at least one combustion chamber, the fuel injection system comprising a high pressure pump, whose flow rate is controllable; and in so doing, a control parameter of the high pressure pump is evaluated during the operation of the internal combustion engine, which allows for a detection of a bottleneck with the high pressure pump with respect to fuel quantity.

The invention therefore allows for a detection of a possible bottleneck with the high pressure pump with respect to fuel quantity, which can occur during the operation of the internal combustion engine and can lead to a disturbance in the operation of the internal combustion engine or to damage of said engine. The control of the flow rate of the high pressure pump can preferably take place by means of a fuel metering unit with an electrically controllable proportional valve on the intake side of the high pressure pump. Said control of the flow rate of the high pressure pump can alternatively but likewise take place by means of controlling the drive of the high pressure pump or by means of a controllable pressure relief valve on the rail side, which connects the high pressure rail to, for example, the fuel tank.

The control parameter of the high pressure pump is evaluated according to the invention at least when a specified fuel temperature of and/or a specified mileage on the internal combustion engine has been exceeded. The control parameter can be an actuating variable of the high pressure pump, which is compared with a default value, which is to be set for the full delivery of the high pressure pump. The actuating variable of the high pressure pump can be a nominal pressure value or a specified nominal fuel flow rate. In so doing, a deviation of the actuating variable of the high pressure pump from the default value, which is to be set for full delivery, is determined, whereby safety measures for avoiding an inadmissible system reaction are introduced if the deviation, which was determined, exceeds a specified threshold value. As an alternative to this, the control parameter can be a current actual fuel pressure produced by the pump; and in so doing, safety measures are introduced to avoid an inadmissible system reaction when the actual fuel pressure drops below a specified threshold value.

The invention can therefore be cost effectively implemented using components and elements, which are already present. In so doing, an inadmissible system reaction, which can lead to a disturbance in the operation of the internal combustion engine and/or to damage of said engine, can be prevented by the taking of suitable safety measures.

The inadmissible system reaction comprises according to the invention damage to an associated exhaust gas catalytic converter, an emergence of increased exhaust gas emissions and an impairment of the drivability. The safety measures comprise a reduction in the air flow supplied to the combustion chamber in order to prevent a leaning-out of the air/fuel mixture to be combusted in the combustion chamber.

The occurrence of a bottle neck with the high pressure pump with respect to fuel quantity is prevented in a simple manner with components and elements, which are already present, whereby the possible disturbance in the operation of the internal combustion engine and/or the damage to said engine are likewise avoided.

The problem mentioned at the beginning of the application is also solved by a computer program for implementing a method for controlling a fuel injection system of an internal combustion engine with at least one combustion chamber. The fuel injection system comprises a high pressure pump, to which a fuel metering unit for the feeding of fuel is assigned. The fuel metering unit controls the fuel quantity delivered. The computer program evaluates a control parameter of the high pressure pump during the operation of the internal combustion engine. Said control parameter makes a detection of a bottleneck with the high pressure pump with respect to fuel quantity possible.

The problem mentioned at the beginning of the application is also solved by an internal combustion engine with at least one combustion chamber and a fuel injection system, which comprises a high pressure pump, whose flow rate is controllable, particularly in that a fuel metering unit for feeding the fuel is assigned to the high pressure pump, the fuel metering unit controlling the fuel quantity delivered and a control parameter, which allows for a detection of a bottleneck with the high pressure pump with respect to fuel quantity, being evaluated during the operation of the internal combustion engine.

BRIEF DESCRIPTION OF THE DRAWINGS

An example of embodiment of the invention at hand is explained below in detail with the aid of the accompanying drawing. The following are thereby shown.

DETAILED DESCRIPTION

Figure 1:
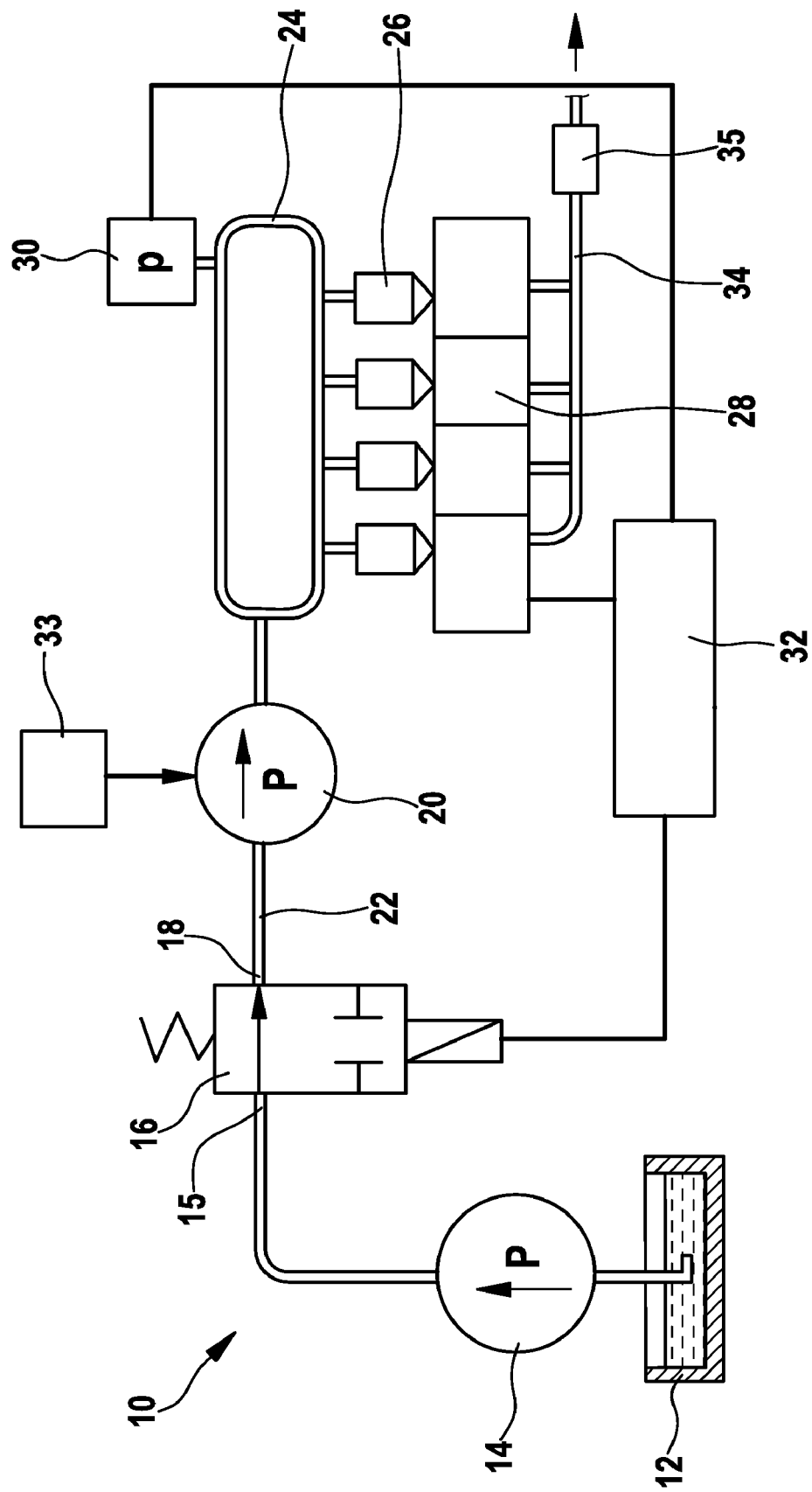
FIG. 1 a schematic depiction of a fuel injection system of an internal combustion engine with a high pressure pump.

FIG. 1 shows a schematic depiction of a fuel injection system 10 of an internal combustion engine. Said fuel injection system 10 comprises a fuel tank 12, from which a feed pump 14 delivers fuel to an ingress 15 of, for example, a fuel metering unit 16, which is designed as a suction throttle. The outlet 18 of said fuel metering unit 16 leads to a fuel high pressure pump 20. The low pressure line, which runs from the fuel tank 12 up to high pressure pump 20, bears in total the reference numeral 22.

The high pressure pump 20 preferably has a conveying chamber with a check valve disposed on the inlet side. Said high pressure pump 20 compresses the fuel to a very high pressure and delivers it into a fuel collector line 24, in which the fuel is stored under very high pressure and which is also denoted as a "distributor tube", respectively "rail". A plurality of injectors 26, which directly inject the fuel into associated combustion chambers 28 of the internal combustion engine, which is subsequently not depicted in detail, are connected to said fuel collector line 24. On the outlet side of said high pressure pump 20, the combustion chambers 28 are disposed in an exhaust gas tract 34, in which provision is illustratively made for an exhaust gas catalytic converter 35. The internal combustion engine serves for instance to drive a motor vehicle.

The pressure in the fuel collector line 24 is acquired by a pressure sensor 30. The pressure sensor 30 transfers its signals to a control and adjustment device 32, which is connected on the outlet side to among other things a fuel metering unit 16. The flow rate of the high pressure pump 20 is adjusted by the fuel metering unit 16. In this connection, three different operating conditions of the fuel metering unit 16 distinguish themselves from each other: zero delivery, partial delivery and full delivery. If the fuel metering unit 16 delivers a maximum possible fuel quantity from the feed pump 14 to the high pressure pump 20, which from there is delivered further to the fuel collector line 24, the operating condition of full delivery is prevailing. If, however, only a smaller fuel quantity is delivered to the high pressure pump 20 and from there into the fuel collector line 24, the operating condition of partial delivery is prevailing. If, however, no fuel is delivered into the fuel collector line 24 via the high pressure pump 20, the operating condition of zero delivery is prevailing.

By an adjustment to an operating condition required for the given situation, the actual pressure in the fuel collector line 24, which is acquired by the pressure sensor 30, can be made to track a nominal pressure value to be produced by the high pressure pump 16 for the fuel collector line 24. Said nominal pressure value is specified by a pressure regulator 33.

A method for controlling the fuel injection system 10 of FIG. 1 according to an embodiment of the invention is described below in detail with reference to FIGS. 1 and 2. In so doing, the description will forgo a detailed explanation of the procedural steps known from the technical field.

Figure 2:
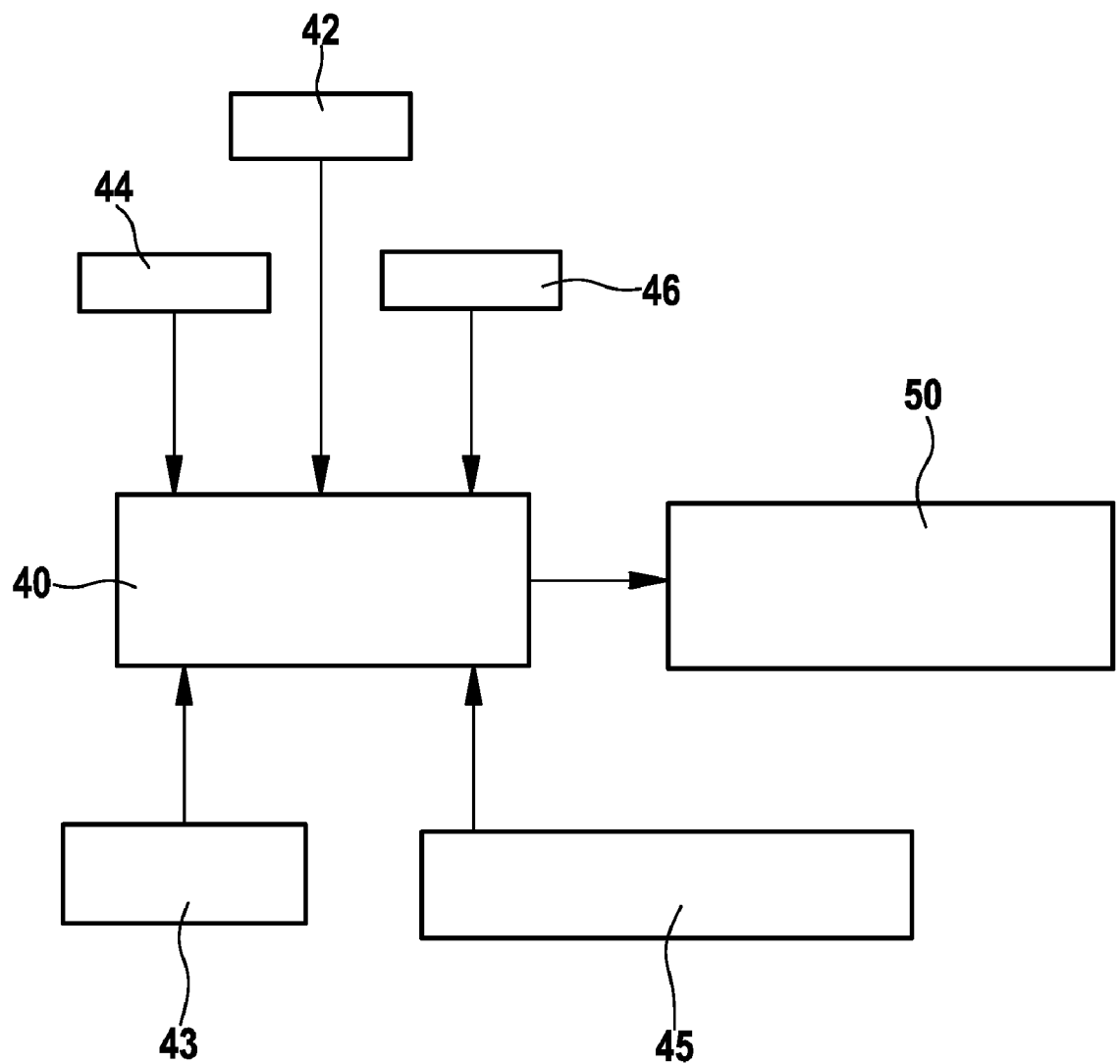
FIG. 2 a schematic depiction of a method for controlling the fuel injection system of FIG. 1.

FIG. 2 shows a schematic depiction of an implementation according to the invention of a method for controlling the fuel injection system 10 of FIG. 1 when detecting a bottleneck with the high pressure pump 20 with respect to fuel quantity during the operation of the internal combustion engine. A bottleneck with respect to fuel quantity is then present if the high pressure pump 20 delivers an insufficient, i.e. too small of a, fuel quantity into the fuel collector line 24 during a specified operating condition, so that the air/fuel mixture to be combusted in the combustion chamber 28 leans out, i.e. deviates from the stoichiometric air/fuel ratio.

According to a preferred embodiment of the invention, the method is implemented as a computer program, which can be executed by a suitable control and adjustment device (for example control and adjustment device 32), for which provision has already been made in the internal combustion engine. This computer program preferably implements a safety function 40 for detecting a possible bottleneck with respect to fuel quantity and for the release of suitable counter, respectively safety, measures in order to prevent a negative effect on the operation, respectively damage to the internal combustion engine. The invention can consequently be simply and cost effectively implemented with components of the internal combustion engine, which are already present.

During the operation of the internal combustion engine, the safety function 40 evaluates a control parameter 42 of the high pressure pump 20 at least during critical operating conditions of the internal combustion engine, which allows for a detection of a bottleneck with the high pressure pump 20 with respect to fuel quantity. Such critical operating conditions are conditions, wherein a reduction of the fuel flow rate can occur during the operation of the respective internal combustion engine. These occur, for example, when a specified fuel temperature of and/or a specified mileage on the internal combustion engine have been exceeded.

The safety function 40 monitors according to the invention one or a plurality of ambient conditions 45, from which at least the fuel temperature can be derived. In order that the safety function 40 when detecting a possible bottleneck with respect to fuel quantity is in the position to distinguish between an operational bottleneck and a bottleneck occurring due to system errors, for example a bottleneck due to a fuel leakage in the high pressure system, the ambient conditions 45 also preferably comprise the ambient and/or engine temperature as well as other ambient parameters, which can be used to draw such a distinction. Furthermore, the safety function 40 also monitors system diagnostic parameters 43 of the fuel injection system 10, which can provide insight into critical operating conditions, as well as operating parameters 44 of the internal combustion engine, as for example load and engine rotational speed, from which at least the mileage on the internal combustion engine can be derived.

The evaluated control parameter is according to a preferred embodiment of the invention an actuating variable 42 of the high pressure pump 20, which is compared with a default value to be set for full delivery of the high pressure pump 20. The actuating variable 42 of the high pressure pump 20 can be a specified nominal fuel flow rate. In so doing, a deviation of the actuating variable 42 of the high pressure pump 20 from the default value to be set for full delivery is determined for detecting a possible bottleneck with respect to fuel quantity. This deviation can be supplied to the safety function 40 also as a controller deviation 46.

If the deviation of the actuating variable 42 of the high pressure pump 20 from the default value to be set for full delivery tends toward zero, it is thereby assumed that an operating condition can emerge, wherein the fuel quantity delivered is no longer sufficient for the trouble-free operation of the internal combustion engine. The safety function 40 therefore introduces safety measures 50 for avoiding an inadmissible system reaction if this deviation undershoots a specified threshold value in order to prevent a bottleneck with respect to fuel quantity from occurring. An inadmissible system reaction is a reaction of the fuel injection system 10, which leads to a disruption in the operation and/or to damage to the internal combustion engine and, for example, has as a consequence damage to the exhaust gas catalytic converter 35, the emergence of increased exhaust gas emissions or an impairment of the drivability. Such an inadmissible system reaction can according to the invention be prevented by a safety measure, which causes a reduction in the air quantity supplied to the combustion chamber 28 when a possible bottleneck with respect to fuel quantity has been detected. As a result, a leaning-out of the air/fuel mixture to be combusted in the combustion chamber 28 can be prevented, the engine's torque being reduced at the same time.

According to a preferred embodiment of the invention the reduction in the engine's torque solely takes place during critical operating conditions, i.e. during operating conditions, wherein a bottleneck with respect to fuel quantity can actually occur as described above. Furthermore, the engine's torque is in each case maximally reduced in such a way that a faulty fuel quantity respectively occurring at a possible bottleneck with respect to fuel quantity is compensated. This respective faulty fuel quantity can be determined as a function of the corresponding configuration of the high pressure pump 20 during the prevailing operating conditions for a given situation.

As an alternative for using the nominal pressure value or the specified nominal fuel flow rate as the control parameter, an actual current fuel pressure produced by the high pressure pump 10 can be used. In this case this actual fuel pressure is monitored instead of the determination of the deviation of the actuating variable 42 of the high pressure pump 20 from the default value to be set for full delivery. This is particularly advantageous in so-called "constantly delivering" fuel systems, wherein the high pressure pump constantly delivers a maximum fuel flow and wherein a respectively excess fuel quantity is led back via an associated excess-pressure valve into an associated low pressure system. If in so doing the actual pressure being monitored deviates too drastically from the specified fuel pressure of the maximum fuel flow to be delivered, this is an indication of a bottleneck with respect to fuel quantity. Suitable safety measures according to the invention are accordingly introduced to avoid an inadmissible system reaction if the prevailing actual fuel pressure drops below a specified threshold value.

The invention claimed is:

1. A fuel injection system of an internal combustion engine with at least one combustion chamber comprising:
   a high pressure pump having a controllable flow rate; and
   a fuel metering unit for feeding a controllable quantity of fuel to the high pressure pump, wherein a control parameter that is an actuating variable of the high pressure pump that is compared with a default value to be set for full delivery of the high pressure pump is evaluated and used to detect and prevent stoichiometric deviation of an air-fuel mixture used for combustion in the at least one combustion chamber.

2. A fuel injection system of an internal combustion engine with at least one combustion chamber comprising:
   a high pressure pump having a controllable flow rate; and
   a fuel metering unit for feeding a controllable quantity of fuel to the high pressure pump, wherein a control parameter that is a current actual fuel pressure produced by the high pressure pump is evaluated and used to detect and prevent stoichiometric deviation of an air-fuel mixture used for combustion in the at least one combustion chamber, and wherein safety measures are introduced to avoid an inadmissible system reaction when the actual fuel pressure drops below a specified threshold value, the inadmissible system reaction comprising damage to an associated exhaust gas catalytic converter, an emergence of increased exhaust gas emissions, and an impairment of drivability.

3. A fuel injection system of an internal combustion engine with at least one combustion chamber comprising:
   a high pressure pump having a controllable flow rate; and
   a fuel metering unit for feeding a controllable quantity of fuel to the high pressure pump, wherein a control parameter that is a current actual fuel pressure produced by the high pressure pump is evaluated and used to detect and prevent stoichiometric deviation of an air-fuel mixture used for combustion in the at least one combustion chamber, and wherein safety measures are introduced to avoid an inadmissible system reaction when the actual fuel pressure drops below a specified threshold value, the safety measures comprising a reduction in an air quantity delivered to the combustion chamber in order to prevent a leaning-out of air/fuel mixture to be combusted in the combustion chamber.

4. A computer program executing on a computing device that executes steps to control a fuel injection system of an internal combustion engine with at least one combustion chamber, wherein the fuel injection system comprises a high pressure pump having a controllable flow rate, and wherein a fuel metering unit for feeding the fuel is assigned to the high pressure pump for controlling a delivered fuel quantity, the steps including evaluating a control parameter that is an actuating variable of the high pressure pump that is compared with a default value to be set for full delivery of the high pressure pump, wherein the control parameter is used to detect and prevent stoichiometric deviation of an air-fuel mixture used for combustion in the at least one combustion chamber.

5. A computer program executing on a computing device that executes steps to control a fuel injection system of an internal combustion engine with at least one combustion chamber, wherein the fuel injection system comprises a high pressure pump having a controllable flow rate, and wherein a fuel metering unit for feeding the fuel is assigned to the high pressure pump for controlling a delivered fuel quantity, the steps including evaluating a control parameter that is a current actual fuel pressure produced by the high pressure pump, wherein the control parameter is used to detect and prevent stoichiometric deviation of an air-fuel mixture used for combustion in the at least one combustion chamber, and wherein safety measures are introduced to avoid an inadmissible system reaction when the actual fuel pressure drops below a specified threshold value, the inadmissible system reaction comprising damage to an associated exhaust gas catalytic converter, an emergence of increased exhaust gas emissions, and an impairment of drivability.

6. A computer program executing on a computing device that executes steps to control a fuel injection system of an internal combustion engine with at least one combustion chamber, wherein the fuel injection system comprises a high pressure pump having a controllable flow rate, and wherein a fuel metering unit for feeding the fuel is assigned to the high pressure pump for controlling a delivered fuel quantity, the steps including evaluating a control parameter that is a current actual fuel pressure produced by the high pressure pump, wherein the control parameter is used to detect and prevent stoichiometric deviation of an air-fuel mixture used for combustion in the at least one combustion chamber, and wherein safety measures are introduced to avoid an inadmissible system reaction when the actual fuel pressure drops below a specified threshold value, the safety measures comprising a reduction in an air quantity delivered to the combustion chamber in order to prevent a leaning-out of air/fuel mixture to be combusted in the combustion chamber.

7. A method for controlling a fuel injection system of an internal combustion engine with at least one combustion chamber, wherein the fuel injection system comprises a high pressure pump having a controllable flow rate, the method comprising:
evaluating a control parameter that is a current actual fuel pressure produced by the high pressure pump, wherein the control parameter is used to detect and prevent stoichiometric deviation of an air-fuel mixture used for combustion in the at least one combustion chamber, and wherein safety measures are introduced to avoid an inadmissible system reaction when the actual fuel pressure drops below a specified threshold value, the inadmissible system reaction comprising damage to an associated exhaust gas catalytic converter, an emergence of increased exhaust gas emissions, and an impairment of drivability.

8. A method for controlling a fuel injection system of an internal combustion engine with at least one combustion chamber, wherein the fuel injection system comprises a high pressure pump having a controllable flow rate, the method comprising:
evaluating a control parameter that is a current actual fuel pressure produced by the high pressure pump, wherein the control parameter is used to detect and prevent stoichiometric deviation of an air-fuel mixture used for combustion in the at least one combustion chamber, and wherein safety measures are introduced to avoid an inadmissible system reaction when the actual fuel pressure drops below a specified threshold value, the safety measures comprising a reduction in an air quantity delivered to the combustion chamber in order to prevent a leaning-out of air/fuel mixture to be combusted in the combustion chamber.

9. A method for controlling a fuel injection system of an internal combustion engine with at least one combustion chamber, wherein the fuel injection system comprises a high pressure pump having a controllable flow rate, the method comprising:
evaluating a control parameter that is an actuating variable of the high pressure pump that is compared with a default value to be set for full delivery of the high pressure pump, wherein the control parameter is used to detect and prevent stoichiometric deviation of an air-fuel mixture used for combustion in the at least one combustion chamber.

10. A method according to claim 9, further comprising evaluating the control parameter of the high pressure pump upon one of a fuel temperature and a mileage of the internal combustion engine exceeding a specified value.

11. A method according to claim 9, wherein the actuating variable of the high pressure pump is one of a specified nominal pressure value and a specified nominal fuel flow rate.

12. A method according to claim 9, wherein the control parameter is a current actual fuel pressure produced by the high pressure pump, and wherein safety measures are introduced to avoid an inadmissible system reaction when the actual fuel pressure drops below a specified threshold value.

13. A method according to claim 9, further comprising determining a deviation of the actuating variable of the high pressure pump from the default value to be set for a full delivery, and wherein safety measures are introduced to avoid an inadmissible system reaction if the determined deviation undershoots a specified threshold value.

14. A method according to claim 13 wherein the inadmissible system reaction comprises: damage to an associated exhaust gas catalytic converter; an emergence of increased exhaust gas emissions; and an impairment of drivability.

15. A method according to claim 13 wherein the safety measures comprise a reduction in an air quantity delivered to the combustion chamber in order to prevent a leaning-out of the air/fuel mixture to be combusted in the combustion chamber.

* * * * *